United States Patent [19]
Yokoyama et al.

[11] 3,864,501
[45] Feb. 4, 1975

[54] METHOD OF ENHANCING COLORATION OF FRUITS AND VEGETABLES WITH A DIALHYLAMINO-ALKOXYBENZENE

[75] Inventors: Henry Yokoyama; Wan-Jean Hsu, both of Pasadena; Stephen M. Poling, Seal Beach, all of Calif.

[73] Assignee: The United States of America as represented by the Secretary of Agriculture, Washington, D.C.

[22] Filed: Oct. 10, 1973

[21] Appl. No.: 404,980

[52] U.S. Cl. ............... 426/268, 426/250, 426/252, 426/311, 426/377
[51] Int. Cl. .............................................. A23l 1/27
[58] Field of Search ........... 426/268, 311, 250, 252, 426/73

[56] References Cited
UNITED STATES PATENTS
3,032,406    5/1962    D'Amico .............................. 71/116
3,684,530    8/1972    Yokoyama ........................... 426/268

OTHER PUBLICATIONS
Chemical Abstracts, Vol. 77, 1972, 43781n.

*Primary Examiner*—A. Louis Monacell
*Assistant Examiner*—Curtis P. Ribando
*Attorney, Agent, or Firm*—M. Howard Silverstein; Max D. Hensley; William Takacs

[57] ABSTRACT

The color of fruits and vegetables is enhanced by applying thereto a compound which has the ability to cause the accumulation of lycopene in the tissues of the treated produce. Examples of compounds used in accordance with the invention are:
  4-[β-(diethylamino)-ethoxy]-benzaldehyde
  4-[β-(diethylamino)-ethoxy]-benzene
  N,N-diethyl-ethanolamine
  β-(diethylamino)ethyl anisolate
  N,N-diethyl-phenylpropylamine

16 Claims, No Drawings

METHOD OF ENHANCING COLORATION OF FRUITS AND VEGETABLES WITH A DIALHYLAMINO-ALKOXYBENZENE

DEFINITIONS

Various symbols used in this document are defined as follows:

The abbreviations "Et" and "Me" refer to ethyl and methyl, respectively.

"Lower alkyl" means an alkyl radical containing one to four carbon atoms. Similarly, "lower alkoxy" means an alkoxy radical having one to four carbon atoms.

The symbol "Ph" designates the phenyl radical. The phenylene radical ($-C_6H_4-$) is depicted by the symbol $-\phi-$. Where particular positions of substituents are involved, this is designated by appropriate numbers. Thus $$-/4 \; \phi \; 1/-$$

indicates that the substituents are at the 1,4 positions, i.e., para to one another.

DESCRIPTION OF THE INVENTION

This invention relates to and has among its objects the provision of novel processes for coloring fruits and vegetables.

Further objects of the invention will be evident from the following description wherein parts and percentages are by weight unless otherwise specified.

In the following description, the application of the invention to citrus fruits is stressed. It is to be understood that this particular embodiment of the invention is provided by way of illustration and not limitation. In its broad ambit, the invention is applicable to all kinds of fruits and vegetables which contain carotenogenic tissues, that is, tissues which produce carotenoid pigments. Illustrative examples of such fruits and vegetables are apricots, peaches, cherries, nectarines, tomatoes, bell peppers, chili peppers, carrots, sweet potatoes, etc., as well as oranges, lemons, tangerines, grapefruit, and other citrus fruits.

It is well-known that one factor which influences the market value of fruits and vegetables is the color thereof. It often happens that when fruits and vegetables are received at the packing house, their color is deficient even though they are entirely ripe and in excellent condition. This is particularly true with citrus fruit in which case, owing to vagaries in the weather, position of the fruit on the tree, etc., the harvested fruit is often pale or non-uniform in color despite the fact that it is physiologically mature.

A principle object of the invention is to obviate the problem outlined above. The invention provides the means whereby the color of harvested fruits and vegetables can be improved, for example, oranges or tangerines which are yellow or greenish can be provided with a rich orange color.

Basically, the objects of the invention are attained by applying to the whole harvested fruit or vegetables any of the components described below.

Group I

Compounds of the structure

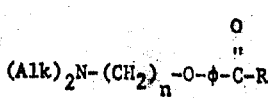

wherein:

Alk is lower alkyl, preferably methyl or ethyl.
$n$ is an integer from 2 to 4.
R is a member of the group consisting of H, lower alkyl, phenyl, $-CH=CH-Ph$, and $-CH_2-CH_2-Ph$.

Group II

Compounds of the structure

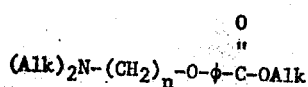

wherein:

Alk is lower alkyl, preferably methyl or ethyl.
$n$ is an integer from 2 to 4.

Group III

Compounds of the structure

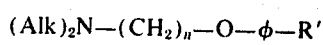

wherein:

Alk is lower alkyl, preferably methyl or ethyl.
$n$ is an integer from 2 to 4.
R' is a member of the group consisting of H, $-OH$, lower alkyl, and lower alkoxy.

Group IV

Compounds of the structure

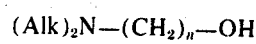

wherein:

Alk is lower alkyl, preferably methyl or ethyl.
$n$ is an integer from 2 to 4.

Group V

Compounds of the structure

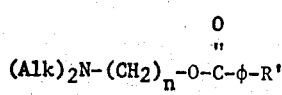

wherein:

Alk is lower alkyl, preferably methyl or ethyl.
$n$ is an integer from 2 to 4.
R' is a member of the group consisting of H, $-OH$, lower alkyl, and lower alkoxy.

Group VI

Compounds of the structure

wherein:

Alk is lower alkyl, preferably methyl or ethyl.
$m$ is an integer from 1 to 5.
R' is a member of the group consisting of H, $-OH$, lower alkyl, and lower alkoxy.

Group VII

Compounds of the structure

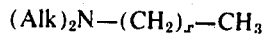

wherein:

Alk is lower alkyl, preferably methyl or ethyl.
$x$ is an integer from 3 to 7.

Group VIII

Compounds of the structure

wherein:
Alk is lower alkyl, preferably methyl or ethyl.
$n$ is an integer from 2 to 4.
R'' is a member of the group consisting of H, lower alkyl, and phenyl.

The compounds of the invention operate not by any dyeing effect (they are themselves essentially colorless), but by inducing the selective accumulation of lycopene as the predominant pigment in the carotenogenic tissue. Lycopene is the natural red coloring principle of the tomato, and its accumulation in the tissue causes an intensification of the color of the treated fruit or vegetable. Depending on the amount of lycopene formed, the treated produce will assume an orange or even a red color.

Contributing to the color enhancement obtained in the process of the invention is that the applied compounds also increase the production (in the treated tissue) of provitamins A, including $\alpha$-, $\beta$-, and especially $\gamma$-carotene.

Since the compounds of the invention are effective in very small amounts, they are most conveniently applied in conjunction with an inert carrier such as water, ethanol, isopropanol, or wax. A typical plan for carrying out the treatment of the invention is to dip the fruit or vegetable in an aqueous or isopropanol solution containing a small proportion-for example, about 0.1 to 10 percent—of any of the compounds described above. It is, of course, not essential to apply the solution by dipping; it can be applied by spraying, flooding, or the like.

Since many fruits and vegetables have a natural waxy outer coating which is water-repellent, it is preferred that the treating solution contain a wetting agent so that the solution can uniformly coat the entire surface of the fruit or vegetable. For this purpose one may use any conventional surfactant such as soaps, sodium alkyl ($C_8$–$C_{18}$) sulphates, sodium alkane ($C_8$–$C_{18}$) sulphonates, sodium alkyl ($C_8$–$C_{20}$) benzene sulphonates, esters of sulphosuccinic acid such as sodium dioctylsulphosuccinate, etc. Wetting and dispersing agents of the non-ionic type are suitable, for example, the reaction products of ethylene or propylene oxide with fatty acids, with polyhydric alcohols, with partial esters of fatty acids and polyhydric alcohols, or with alkyl phenols, etc. Typical of such agents are a polyoxyethylene stearate containing about 20 oxyethylene groups per mole, a polyoxyethylene ether of sorbitan monolaurate containing about 16 oxyethylene groups per mole, a distearate of polyoxyethylene ether of sorbitol containing about 40 oxyethylene groups per mole, isooctylphenyl ether of polyethylene glycol, etc. Generally, only a small proportion of surfactant is used—on the order of 0.05 to 0.5 percent, based on the weight of solution. In addition to, or in place of the surfactant, a supplementary solvent may be added to the primary solvent (water) in quantity sufficient to disperse the active agent. For such purpose one may use ethanol, isopropanol, or other inert volatile solvent, particularly one which is at least partly miscible with water. It is evident that the solutions need not necessarily be true solutions; they may be colloidal solutions, emulsions, or suspensions, all of these being considered as solutions for the purposes of the invention.

It may also be observed that some of the compounds of the invention—those with long alkyl chains—exhibit emulsifying activity and can be used in aqueous solution without any added wetting agent.

In the event that the compounds of the invention are applied in a wax carrier, one may use for the purpose any wax, including hydrocarbon waxes such as paraffin or microcrystalline petroleum wax; beeswax; carnauba wax, spermaceti; etc. The preparation will generally contain about 0.1 to 10 percent of any of the compounds described above, and may be applied in various ways. One technique is to liquefy the preparation by warming it and then applying it to the fruit or vegetable by dipping or spraying. Another plan is to dissolve the wax-containing preparation in an inert volatile solvent such as hexane, octane, stoddard solvent, deodorized kerosene, or other volatile petroleum fraction and apply the resulting solution by spraying or dipping to the product.

The action of the compounds is not immediate; the development of color requires some time for chemical reactions to take place within the tissue. Accordingly, after the step of applying the compound, the treated produce is held so that the desired coloration will develop. The temperature at which the holding is conducted may vary—for example, from about 15° to about 35° C.—and influences the rate of coloration in that color enhancement will take place more rapidly at the higher temperatures, and vice versa. Usually, for convenience it is preferred to conduct the holding at room temperature. Regardless of the temperature used, the treated fruit or vegetable should have access to air during the holding period so that it can respire and remain in a vital condition. The time required for color development in any particular case will vary depending on several factors including the type of fruit or vegetable, the particular compound used and the amount applied, the temperature during the holding period, the degree of color enhancement desired, etc. In many cases, excellent color development is obtained where treated citrus fruits are held for about 12–72 hours at ambient temperature.

When the desired color level has been attained, the fruit or vegetable may be stored at conventional cold storage temperature (about 5°–10° C.) until it is to be used. At such temperatures the established color is retained, and further color development is retarded. Storage under such conditions can be applied for periods of up to 2 or 3 months without excessive deepening of color or deterioration of the fruit or vegetable.

Since the enhancement of color in accordance with the invention involves the biosynthesis of lycopene within the fruit or vegetable tissue, it is obvious that the product to which the invention is applied be in a fresh condition, i.e., in a physiologically-active state so that it is capable of respiring and undergoing normal post-harvest metabolic changes.

Where the compounds of the invention are applied to the surface of fruits or vegetables, the coloration enhancement will take place in the peel or rind of the treated product. If deeper color enhancement is desired such as coloration of the flesh together with coloration of the peel, the compounds are applied in such a way that they penetrate through the peel. This can be done by vacuum infiltration. Thus the fruit or vegetable is placed in a vessel with an excess of a solution containing a compound of the invention. The vessel is sealed and a vacuum is applied and then released. This causes the solution to permeate the peel to the flesh within. The treated product is then stored as described to develop the desired coloration.

Hereinabove we have stressed the application of the invention for the purpose of enhancing the color of fruits and vegetables. Another phase of the invention is concerned with the preparation of carotenoid pigments which may be used for coloring food products of all kinds. A special advantage of these carotenoid pigments is that they are natural constituents of fruits and vegetables and thus can be safely used in foods. In practicing this phase of the invention, fruits or vegetables, or parts thereof are treated with any of the compounds described above and stored to develop substantial increase in color. The so-formed carotenoid pigments are then isolated from the treated substrate by conventional means such as pressing or extraction with a solvent. In a preferred embodiment of this aspect of the invention, the procedure is applied to the peels of oranges, lemons, grapefruit or other citrus fruit which are obtainable as waste from food processing plants. The peels are coated by spraying or dipping with an aqueous solution containing about 0.1 to 10 percent of any of the color-enhancing compounds herein described. Preferably, to attain good contact of the solution with the peels, a small proportion of a wetting agent is incorporated therein. Also to retard mold growth or other microbial deterioration, it is preferred that the solution contain a small proportion—for example, about 0.05 to 0.1 percent—of a preservative such as sodium benzoate, sodium sorbate, or the lower alkyl esters of parahydroxybenzoic acid. The peels are then allowed to stand at room temperature for several days (usually about a week) until a strong color enhancement is attained. It is of course obvious that since the development of carotenoids is based on biochemical changes, the peel to which the process is applied should be in a fresh condition so that it constitutes a viable living system capable of further carotenoid biosynthesis. Also the peel should be exposed to air during the storage period so that respiration can take place. Following completion of the storage period, the peels are treated as by pressing or extraction to recover the carotenoid pigments therefrom. Preferably the treated peel is extracted with a mixture of equal volumes of isopropanol and acetone. The extract is then treated to evaporate the solvent, leaving as a residue the desired product—a mixture of carotenoid pigments which will generally contain lycopene as the principal pigment.

The invention is further demonstrated by the following illustrative examples.

EXAMPLE Ia

There was prepared a 10% (w/v) solution in isopropanol of 4-[β-(diethylamine)ethoxy]-benzaldehyde $$Et_2N-CH_2-CH_2-O-/4\ \phi\ 1/-CHO$$

Marsh seedless grapefruit (yellow in color) was dipped for 3 seconds in the solution, then held at room temperature (about 20°-22° C.) for 2 weeks during which time the fruit developed a red color. The peel was then analyzed, and the following results obtained: The lycopene content was 140 μg per gram dry weight of peel, whereas the untreated fruit contained no lycopene. Also, there was a ten-fold increase in α-carotene content and a four-fold increase in β-carotene content.

EXAMPLE Ib

The compounds used in this example had the structure:

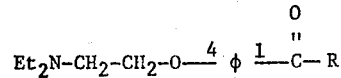

wherein R was as follows:
Compound A: —H
Compound B: —Me
Compound C: —Ph
Compound D: —Ch=CH—Ph
Compound E: —CH$_2$—CH$_2$—Ph Solutions were prepared in isopropanol, each containing 0.5% (w/v) of one of the compounds.

Marsh seedless grapefruit (yellow in color) were dipped for 3 seconds in the solutions, then held at room temperature (about 20°-22° C.). Within 24 hours, the fruit in each case had developed a light orange color. After 5 days of storage, the fruit attained a deep-orange color, and after 2 weeks of storage the fruit was red in color.

Similar results were obtained where navel oranges or other citrus fruit was substituted for the grapefruit.

The peel from the grapefruit which had developed a red color was analyzed, and the following results obtained: Lycopene was found to be the main pigment, 250–260 μg/g (dry basis), whereas lycopene is not present in the peel of the untreated fruit. Also, the content of γ-carotene was found to be increased about three-fold, i.e., to 20-25 μg/g (dry basis).

EXAMPLE II

The compound used in this example was

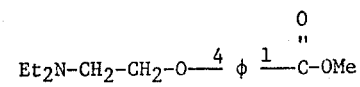

A solution was prepared containing 0.5% (w/v) of the compound in isopropanol. Marsh seedless grapefruit (yellow in color) was dipped for 3-5 seconds in the solution, then held at room temperature (about 20°-22° C.). Within 24 hours the fruit had developed a light orange color. After 5 days of storage the fruit attained a deep orange color, and became red after 2 weeks.

EXAMPLE IIIa

The compounds used in this example had the structure

wherein R' was as follows:
Compound A: —H
Compound B: —OH
Compound C: —Me
Compound D: —OMe Solutions were prepared in isopropanol, each containing 0.5% (w/v) of one of the compounds.

Marsh seedless grapefruit (yellow in color) were dipped for 3-5 seconds in the solutions, then held at room temperature (about 20°-22° C.). Within 12 days visible color enhancement had appeared, and after 4 weeks a red color dominated. Analysis of the peel of the treated fruit indicated that lycopene and γ-carotene contents were significantly increased, in the order of magnitude similar to those for the compounds of Example I*b*.

EXAMPLE III*b*

The compounds used in this example had the structure $$Et_2N-CH_2-CH_2-O-4\,\phi\,1-R'$$

wherein R' was as follows:
  Compound A: —H
  Compound B: —OH
  Compound C: —Me
  Compound D: —OMe Citrus fruits were dipped in or sprayed with isopropanol solutions containing 1–5% (w/v) of the above compounds, and then held at room temperature (about 20°–22° C). For example, Marsh seedless grapefruit treated with a 5% solution of Compound A developed an enhanced color after 1–2 days. This initial color was light orange and it developed into a darker orange within a week. The orange color persisted for about an additional 3 weeks, after which enough lycopene was accumulated to turn the fruit red. Analysis indicated that amounts of carotenoid pigments corresponding closely with those obtained with compounds of Group I.

EXAMPLE III*c*

The compounds used in this example had the structure $$Et_2N-(CH_2)_4-O-4\,\phi\,1-R'$$

wherein R' was as follows:
  Compound A: —H
  Compound B: —OH
  Compound C: —Me
  Compound D: —OMe Various products (e.g., citrus fruits, tomatoes, and sweet potatoes) were dipped in or sprayed with isopropanol solutions containing 1 to 5% (w/v) of the above compounds, and then held at room temperature (about 20°–22° C.) to develop the color. The results obtained were similar to those observed in Example III*b*, with slightly less lycopene being accumulated and a larger amount of zeta-carotene produced. The overall effect was to greatly enhance the color of citrus fruits, tomatoes, sweet potatoes, and other carotenogenic tissue.

EXAMPLE III*d*

The compounds used in this example had the structures
  Compound A: Me₂N—CH₂—CH₂—O—Ph
  Compound B: Me₂N—CH₂—CH₂—CH₂—O—Ph Fruits or vegetables were dipped in or sprayed with 0.5–5% (w/v) solutions of the compounds in isopropanol, and then stored at about 20°–22° C. for varying periods of time depending on the color desired. For instance, Marsh seedless grapefruit treated with a 5% solution of Compound B developed a light pink color in 2–3 days. In 2 weeks the color deepened to a light red. It was found that both compounds A and B have the same degree of effectiveness in inducing color.

EXAMPLE IV

The compound used in this example was N,N-diethylethanol amine $$Et_2N-CH_2-CH_2-OH$$

Citrus fruits were dipped in or sprayed with isopropanol solutions containing 0.2 to 0.5% (w/v) of the amine, and then held at room temperature (about 20°–22° C.). It was observed that color development took place at a much slower rate than with the compounds of Groups I, II, and III. For example, Marsh seedless grapefruit which was treated with a 0.5% solution of the amine, developed a slight coloration after 4–5 days and a light red color after 30 days storage. The amount of lycopene in the peel (after 30-day storage) was 18–25 μg/g fresh weight peel.

EXAMPLE V

The compound used in this example was diethylaminoethyl anisolate $$Et_2N-CH_2-CH_2-O-\overset{O}{\overset{\|}{C}}-\overset{1}{-}\phi\overset{4}{-}OCH_3$$

Fruits and vegetables were treated by dipping in or spraying with 5–10% (w/v) solutions of the compound in isopropanol, and then storing the treated product at room temperature (about 20°–22° C.). For example, Marsh seedless grapefruit treated with a 10% solution of the compound developed a light orange color within 2 days, and after 2 weeks the peel developed about 150 μg/g (dry basis) of lycopene. The orange color persisted for a much longer period of time than observed with the compounds of Group I.

EXAMPLE VI

The compounds used in this example had the structure $$Et_2N-(CH_2)_n-Ph$$

wherein *n* was as follows:
  Compound A: 1
  Comound B: 2
  Compound C: 3
  Compound D: 4
  Compound E: 5

Fruits or vegetables were dipped in or sprayed with 2–5% (w/v) solutions of the compounds in isopropanol, and then stored at about 20°–22° C. for varying periods of time depending on the color desired. The results obtained are analyzed as follows:

Compound A:
  Marsh seedless grapefruit treated with a 5% solution of Compound A developed a light orange color in 1½ to 2 days, and after 2 weeks a deep orange color appeared. The fruit which had been held until it developed a red color had a lycopene content of 200–250 μg/g dry weight of peel.

Compound B:
  The results obtained were similar to those obtained with Compound A.

Compound C:

Marsh seedless grapefruit treated with a 5% solution of Compound C developed a visible color enhancement (light orange color) overnight, and the color slowly changed to a deep orange over a period of 3–4 weeks. Compound C was rated as much more effective than Compounds A or B.

Compounds D and E:

The effectiveness of these compounds in inducing color in Marsh seedless grapefruit was rated as follows: Compound D was the better, providing the same degree of color as Compound C. Compound E provided an effect similar to that of Compounds A and B.

EXAMPLE VII

The compounds used in this example had the structure $$Et_2N-(CH_2)_x-CH_3$$

wherein $x$ was as follows:
Compound A: 3
Compound B: 4
Compound C: 5
Compound D: 6
Compound E: 7

Fruits or vegetables were dipped in or sprayed with 1–5% (w/v) solutions of the compounds in isopropanol, and then stored at about 20°–22° C. for varying periods of time depending on the color desired. For instance, Marsh seedless grapefruit dipped 3 seconds in a 5% solution of Compound D developed a visible color enhancement (light orange) overnight, and after 3 weeks a deep orange color was formed. At the end of the 5th week the fruit began to appear red—at this stage the lycopene content was 200–250 μg/g dry weight peel.

Of the five compounds tested, it was found that Compound D was the most effective.

EXAMPLE VIII

The compounds used in this example had the structure $$Et_2N-(CH_2)_n-S-R''$$

wherein $n$ and $R''$ are as follows:
Compound A: $n$ is 2, $R''$ is —Ph
Compound B: $n$ is 2, $R''$ is —Et
Compound C: $n$ is 2, $R''$ is —H
Compound D: $n$ is 3, $R''$ is —H Fruits or vegetables were dipped in or sprayed with 1–5% (w/v) solutions of the compounds in isopropanol, and then stored at about 20°–22° C. for varying periods of time depending on the color desired.

Marsh seedless grapefruit treated with 5% solutions of Compounds A or B developed visible color enhancement (light orange) overnight. After a week the fruit attained a deeper orange color and this color persisted for another 2 weeks, after which the fruit turned light red. Compounds A, B, and C did not produce the amount of lycopene attained with many other of the compounds of the invention—the usual amount of lycopene was about 150 μg/g dry weight of peel. It was also observed that Compound C was much less effective than Compounds A or B.

Marsh seedless grapefruit treated with 5% of Compound D exhibited a light pink color after 2–3 days, and the fruit attained a light red color after 3 weeks.

PREPARATION OF THE COMPOUNDS

Some of the compounds used in accordance with the invention are available in commerce. Among these are 4-[β-(diethylamino)-ethoxy] benzaldehyde, N,N-diethylethanolamine, 2-diethylaminoethanethiol, and the N,N-diethylalkylamines. The compounds can also be prepared by known procedures, exemplified as follows:

Group I:

The compounds of this group can be synthesized by the procedure:

$$(Alk)_2N-(CH_2)_n-Cl$$

$$+$$

$$HO-\phi-\overset{O}{\underset{\|}{C}}-R$$

$$\downarrow NaOH$$

$$(Alk)_2N-(CH_2)_n-O-\phi-\overset{O}{\underset{\|}{C}}-R$$

wherein Alk is lower alkyl, $n$ is an integer from 2 to 4, and R is a member of the group consisting of H, lower alkyl, phenyl, —CH=CH—Ph, and —CH₂—CH₂—Ph.

The procedure is further illustrated by the following detailed example.

Preparation of
4-[β-(diethylamino)-ethoxy]-benzophenone

A solution containing 0.15 mole of 4-hydroxybenzophenone and 0.5 mole of NaOH in 80 ml. water was placed in a 3-necked flask equipped with dropping funnel, stirrer, and reflux condenser. The stirred mixture was heated to reflux and a solution containing 0.1 mole of Cl—CH₂—CH₂—NEt₂·HCl in 100 ml. of water was added dropwise over a 1 hour period. The mixture was refluxed for 2 hours after addition of the amine salt had been completed.

The oily layer that separated from the reaction mixture was removed and the residue was extracted three times with 100-ml. portions of ether. The ether extracts and the oily layer were combined, washed with 100 ml. of 5% aqueous NaOH, then with water, and dried over anhydrous sodium sulphate. The resulting ether solution was Filtered, cooled in an ice-bath, and treated with HCl gas. The precipitate which formed was recrystallized from isopropanol, yielding the desired product in the form of its hydrochloride (yield 72%). To obtain the free amine form, the crystalline product was treated with 5% aqueous NaOH, extracted with ether, the ether extract then dried over anhydrous Na₂SO₄, filtered, and evaporated to give the desired product.

Group II:

The compounds of this group can be synthesized by the following scheme, wherein Alk is lower alkyl, and n is an integer from 2 to 4.

$$(Alk)_2N-(CH_2)_n-Cl$$

$$+$$

$$HO-\phi-COOH$$

$$\downarrow NaOH$$

$$(Alk)_2N-(CH_2)_n-O-\phi-COOH$$

The intermediate so produced is then esterified to yield the desired alkyl ester. For instance, where the intermediate is $$Et_2N-CH_2-CH_2-O-\phi-COOH$$

reaction with diazomethane yields the methyl ester, $$Et_2N-CH_2-CH_2-O-\phi-\overset{\overset{O}{\|}}{C}-OMe$$

Group II:

The compounds of this group can be prepared in a manner similar to that for the Group I compounds. Thus $$(Alk)_2N-(CH_2)_n-Cl$$

$$+$$

$$HO-\phi-R'$$

$$\downarrow NaOH$$

$$(Alk)_2N-(CH_2)_n-O-\phi-R'$$

wherein Alk is lower alkyl, n is an integer from 2 to 4, and R' is a member of the group consisting of H, OH, lower alkyl, and lower alkoxy.

One can also use the technique of Foldeak et al., Chem. Abstracts, Vol. 61, 11964e (1964), which involves the scheme:

$$HO-(CH_2)_n-Cl$$

$$+$$

$$HO-\phi-R'$$

$$\downarrow NaOH$$

$$HO-(CH_2)_n-O-\phi-R'$$

$$\downarrow SO_2Cl$$

$$Cl-(CH_2)_n-O-\phi-R'$$

$$\downarrow (Alk)_2NH$$

$$(Alk)_2N-(CH_2)_n-O-\phi-R'$$

In the above formulas, Alk, n, and R' are as above defined.

The following example demonstrates the synthesis of 3-(diethylamino)-propoxy benzene.

Five-hundredths of a mole of Ph—O—(CH₂)₃Br was placed in a 100-ml. round bottom flask. Diethylamine (0.33 mole) was added along with several boiling chips. A reflux condenser was added and the solution refluxed for 3 hours. The reaction mixture was then cooled, neutralized with 200 ml. of aqueous 7.5% NaOH, and extracted with three 100-ml. portions of ether. The combined ether extracts were washed with four 100-ml. portions of H₂O and dried over anhydrous Na₂SO₄. The ether extract was then filtered, cooled in an ice-bath, and HCl gas bubbled through it carefully while stirring. An oily material separated out as a lower layer. This was separated, washed with 100 ml. of ether, then neutralized with 200 ml. of 5% aqueous NaOH and extracted with three 100-ml. portions of ether. The ether extracts were combined, washed with water, dried over anhydrous ether, and evaporated, yielding the desired product as a residue.

Group IV

The compounds of this group can be synthesized by the following scheme, wherein Alk is lower alkyl and n is an integer from 2 to 4:

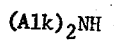

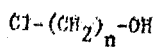

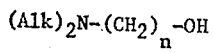

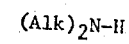

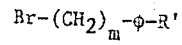

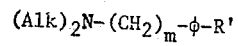

Group V:

The compounds of this group can be synthesized by the procedure given below, wherein Alk is lower alkyl, $n$ is an integer from 2 to 4, and R' is a member of the group consisting of H, OH, lower alkyl, and lower alkoxy.

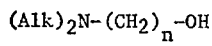

+

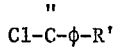

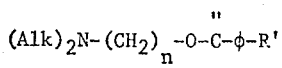

The procedure is typified by the synthesis of diethylaminoethyl anisolate.

One-tenth mole of $Et_2N$—$CH_2$—$CH_2$—OH in 100 ml. benzene was stirred in a round bottom flask equipped with a dropping funnel and reflux condenser. One-tenth mole of $CH_3$—O—4 $\phi$ 1—COCl in 50 ml. benzene was slowly added. The reaction mixture was refluxed for ½ hour, cooled in an ice-bath, and the precipitate collected by filtration. The residual solution was washed with water, and the benzene stripped off on the evaporator. The residue was combined with the precipitate and treated with 5% aqueous NaOH which caused an oil to form. The oil was separated and the remaining solution extracted with ether. The combined oil and ether extract was washed with water and dried over anhydrous $Na_2SO_4$. The ether was removed on the evaporator, yielding the desired product.

Group VI:

The compounds of this group can be synthesized by the following scheme, wherein Alk is lower alkyl, $m$ is an integer from 1 to 5, and R' is a member of the group consisting of H, OH, lower alkyl, and lower alkoxy.

The synthesis is typified by the preparation of N,N-diethylphenylethylamine:

Diethyl amine (21.9 g.) and 18.7 g. of Ph—$CH_2$—$CH_2$—Br were placed in a 100-ml. round bottom flask and refluxed for 4 hours. The reaction mixture was then cooled, neutralized with 200 ml. of 10% aqueous NaOH. The resulting solution was extracted with ether and the ether extract washed thoroughly with water and dried over anhydrous $Na_2SO_4$. Ether was removed on the evaporator, leaving the product as a residue.

Preparation of N,N-diethylphenylbutylamine: One-tenth mole of 4-phenylbutanoic acid in ether was added to 0.15 mole of lithium aluminum hydride in ether in a 3-necked, round-bottomed flask equipped with a stirrer, a dropping funnel, and a reflux condenser fitted with a calcium chloride tube. Rate of addition was limited to that producing a gentle reflux. After addition, the flask was cooled and cold water was added slowly to decompose excess hydride. The reaction mixture was poured into about 20 ml. of ice water and 100 ml. of 10% sulfuric acid was added slowly. The ether layer was separated, and the aqueous layer was extracted with two portions of ether. The combined ether extracts were dried over anhydrous sodium sulfate and the ether was removed on a rotary evaporator.

The crude alcohol (4-phenylbutanol) from above was placed in a flask fitted with a stirrer and a dropping funnel. The contents of the flask were cooled to $-10°$ C. and 1.3 equivalents of phosphorus tribromide was added slowly so that the temperature of the contents was held below 0° C. After addition was completed, the contents were allowed to warm to room temperature and were stirred overnight. At this point the mixture was heated at 100° C. for 3 hours, cooled in an ice-bath, poured into ice-water, and finally extracted several times with ether. The combined ether extracts were washed with water, saturated sodium bicarbonate, and water again, and then dried over anhydrous sodium sulfate. The ether was stripped off on the evaporator.

The resulting bromide (Ph—$(CH_2)_4$—Br) was refluxed with diethylamine as described in the previous example. The reaction mixture was neutralized with 10% aqueous NaOH and extracted with ether. The ether extract was washed with water, dried over anhydrous $Na_2SO_4$, and the ether stripped off, leaving the desired product as a residue.

Group VII:

The compounds of this group can be prepared by the scheme given below, wherein Alk is lower alkyl, and x is an integer from 3 to 7.

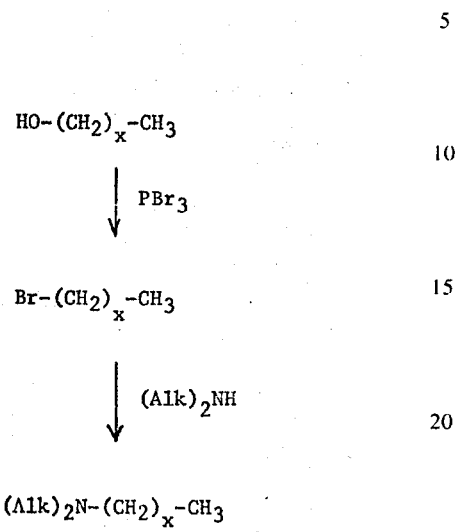

The procedure is illustrated by the following detailed example.

Preparation of N,N-Diethylheptylamine

Phosphorus tribromide (47 g.) was added dropwise with stirring to 46.5 g. of heptanol cooled in an ice-bath. After addition of the tribromide, stirring was continued for 30 min. while the temperature was raised to 100° C., and for 90 min. at 100° C. The mixture was cooled and poured into 200 ml. of ice-water and then extracted with three 150-ml. portions of ether. The combined ether extracts were washed with two 150-ml. portions of water, two 150-ml. portions of saturated sodium bicarbonate, and one 150-ml. portion of water, and dried over anhydrous sodium sulfate. The ether was removed by distillation.

The crude bromide so produced was added to 90 g. of $Et_2NH$. The mixture was stirred and refluxed for 8 hours and then neutralized with 200 ml. of 15% aqueous NaOH and extracted with two 150-ml. portions of ether. The ether extract was washed with four 150-ml. portions of water, then cooled and extracted with 400 ml. of 10% hydrochloric acid (divided into 3 portions and previously cooled in an ice-bath). This HCl extract, cooled in an ice-bath, was neutralized with 200 ml. of 30% aqueous NaOH. The top layer (amine) was separated and the aqueous layer was extracted with two 150-ml. portions of ether. The amine layer and the ether extracts were combined and washed with two 150-ml. portions of water, dried over anhydrous $Na_2SO_4$, and the ether removed by evaporation to give 37.2 g. of N,N-diethylheptylamine.

Group VIII:

The compounds of this group can be prepared by the scheme given below, wherein Alk is lower alkyl, $n$ is an integer from 2 to 4, and R'' is a member of the group consisting of H, lower alkyl, and phenyl.

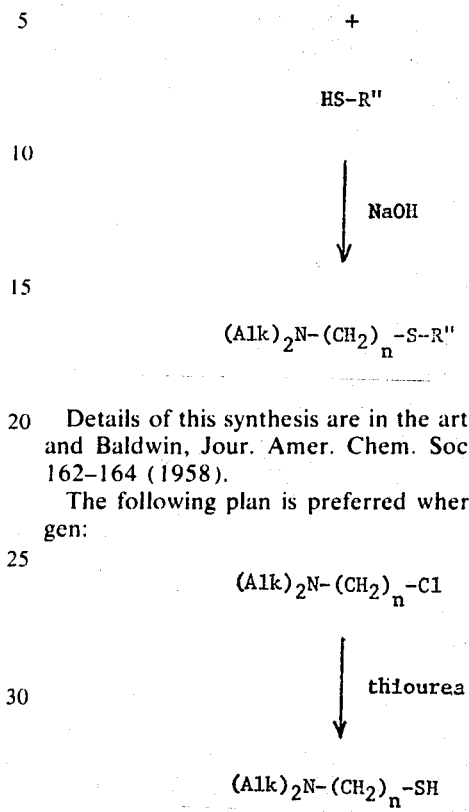

Details of this synthesis are in the article by Schuetz and Baldwin, Jour. Amer. Chem. Soc., Vol. 80, pp. 162-164 (1958).

The following plan is preferred where R'' is hydrogen:

$$(Alk)_2N-(CH_2)_n-Cl$$
$$\downarrow \text{thiourea}$$
$$(Alk)_2N-(CH_2)_n-SH$$

Details of this synthesis are provided by Albertson and Clinton, Jour. Am. Chem. Soc., Vol. 67, p. 1222 (1945).

Having thus described the invention, what is claimed is:

1. A process for enhancing the coloration of harvested fruits and vegetables which contain carotenogenic tissue, which comprises applying to the surface of the fruit or vegetable a compound of the structure $$(Alk)_2N-(CH_2)_n-O-\phi-R'$$

wherein Alk is lower alkyl of 1–4 carbon atoms, $n$ is an integer from 2 to 4, and R' is a member of the group consisting of H, —OH, lower alkyl of 1–4 carbon atoms, and lower alkoxy of 1–4 carbon atoms; and holding the fruit or vegetable for a period long enough to develop an enhanced coloration.

2. The process of claim 1 wherein the fruit or vegetable after application of the aforesaid compound is held at a temperature about from 15° to 35° C.

3. The process of claim 1 wherein the stated compound is $$Et_2N-CH_2-CH_2-O-Ph.$$

4. The process of claim 1 wherein the stated compound is $$Et_2N-CH_2-CH_2-O-4\ \phi 1-OH.$$

5. The process of claim 1 wherein the stated compound is $$Et_2N-CH_2-Ch_2-O-4\ \phi 1-Me.$$

6. The process of claim 1 wherein the stated compound is $Et_2N-CH_2-CH_2-O-4\phi 1-OMe$.

7. The process of claim 1 wherein the stated compound is $Et_2N-CH_2-CH_2-CH_2-O-Ph$.

8. The process of claim 1 wherein the stated compound is $Et_2N-CH_2-CH_2-CH_2-O-4\phi 1-OH$.

9. The process of claim 1 wherein the stated compound is $Et_2N-CH_2-CH_2-CH_2-O-4\phi 1-Me$.

10. The process of claim 1 wherein the stated compound is $Et_2N-CH_2-CH_2-CH_2-O-4\phi 1-OMe$.

11. The process of claim 1 wherein the stated compound is $Et_2N-(CH_2)_4-O-Ph$.

12. The process of claim 1 wherein the stated compound is $Et_2N-(CH_2)_4-O-4\phi 1-OH$.

13. The process of claim 1 wherein the stated compound is $Et_2N-(CH_2)_4-O-4\phi 1-Me$.

14. The process of claim 1 wherein the stated compound is $Et_2N-(CH_2)_4-O-4\phi 1-OMe$.

15. The process of claim 1 wherein the stated compound is $Me_2N-CH_2-CH_2-O-Ph$.

16. The process of claim 1 wherein the stated compound is $Me_2N-CH_2-CH_2-CH_2-O-Ph$.

* * * * *